(12) United States Patent
Hazazi et al.

(10) Patent No.: US 12,612,888 B2
(45) Date of Patent: Apr. 28, 2026

(54) MEMBRANE-BASED ENERGY HARVESTING THROUGH SALINITY GRADIENT OF AVAILABLE UPSTREAM WATER RESOURCES

(71) Applicant: SAUDI ARABIAN OIL COMPANY, Dhahran (SA)

(72) Inventors: Khalid Y. Hazazi, Thuwal (SA); Jehad K. El-Demellawi, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 30 days.

(21) Appl. No.: 18/740,281

(22) Filed: Jun. 11, 2024

(65) Prior Publication Data

US 2024/0418141 A1     Dec. 19, 2024

Related U.S. Application Data

(60) Provisional application No. 63/508,167, filed on Jun. 14, 2023.

(51) Int. Cl.
F03B 13/00 (2006.01)
H02K 7/18 (2006.01)

(52) U.S. Cl.
CPC ........... F03B 13/00 (2013.01); H02K 7/1823 (2013.01); F05B 2220/60 (2013.01)

(58) Field of Classification Search
CPC ... F03B 13/00; H02K 7/1823; F05B 2220/60; B01D 61/025
See application file for complete search history.

(56) References Cited

U.S. PATENT DOCUMENTS

| | | | |
|---|---|---|---|
| 3,906,250 A | 9/1975 | Loeb | |
| 4,171,409 A | 10/1979 | Loeb | |
| (Continued) | | | |

FOREIGN PATENT DOCUMENTS

| | | | |
|---|---|---|---|
| KR | 101328433 B1 | 11/2013 | |
| WO | 2014091199 A1 | 6/2014 | |
| WO | 2023107006 A2 | 6/2023 | |

OTHER PUBLICATIONS

International Search Report issued for corresponding international patent application No. PCT/US2024/033835, mailed Sep. 30, 2024 (6 pages).

(Continued)

*Primary Examiner* — Joseph Ortega
(74) *Attorney, Agent, or Firm* — Osha Bergman Watanabe & Burton LLP

(57)     ABSTRACT

A method for harvesting energy through pressure retarded osmosis includes identifying and pumping a low salinity feed stream and a high salinity feed stream from upstream water sources to opposite ends of a semi-permeable membrane housing where the low salinity feed stream permeates through the semi-permeable membrane to the high salinity feed stream to pressurize and dilute it. The diluted stream rotates a turbine to generate electricity and produce a depressurized mid-salinity fluid. A system for harvesting energy through pressure retarded osmosis has a first and second upstream water source pumped through low and high salinity feed lines to opposite ends of a semi-permeable membrane housing including a container, a semi-permeable membrane, a low salinity side of the housing, and a high salinity housing. The system also has a low salinity exit line, a pressurized mid-salinity exit line, a turbine, a generator, and a depressurized mid-salinity exit line.

13 Claims, 1 Drawing Sheet

(56) References Cited

U.S. PATENT DOCUMENTS

| | | | |
|---|---|---|---|
| 10,938,329 B2 | 3/2021 | Luo et al. | |
| 2009/0071902 A1 | 3/2009 | Stover et al. | |
| 2014/0251909 A1 | 9/2014 | Kelada | |
| 2022/0410067 A1* | 12/2022 | Rao ......................... | C02F 1/441 |

OTHER PUBLICATIONS

Written Opinion issued for corresponding international patent application No. PCT/US2024/033835, mailed Sep. 30, 2024 (9 pages).

Soltani, R. et al., "Modeling and simulation of the dual stage pressure retarded osmosis systems," Desalination, 2019 (13 pages).

Alvarez-Silva et al., "Practical global salinity gradient energy potential," Renewable and Sustainable Energy Reviews, Mar. 4, 2016, pp. 1387-1395, 9 pages.

Ramon et al., "Membrane-based production of salinity-gradient power," Energy & Environmental Science, Jul. 13, 2011, 12 pages.

Siria et al., "New avenues for the large-scale harvesting of blue energy," Natural Reviews: Chemistry, vol. 1, Article No. 0091, Nov. 8, 2017, 10 pages.

* cited by examiner

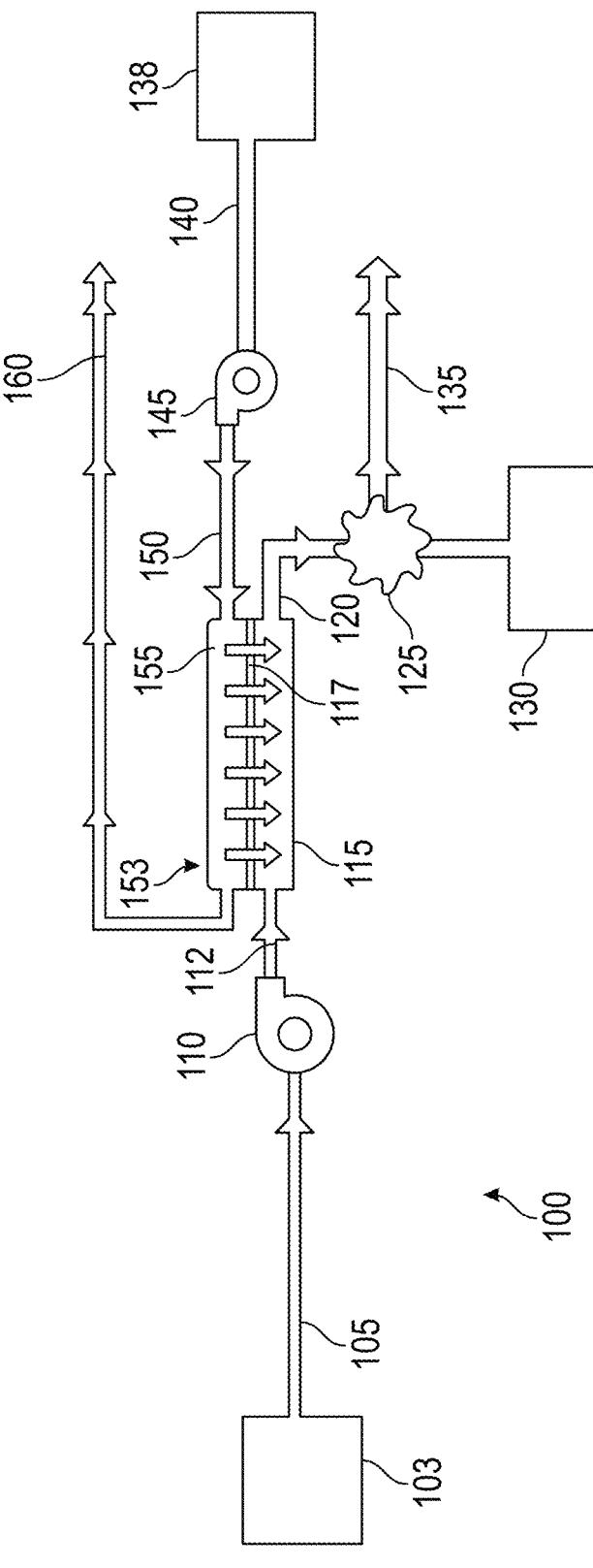

MEMBRANE-BASED ENERGY HARVESTING THROUGH SALINITY GRADIENT OF AVAILABLE UPSTREAM WATER RESOURCES

BACKGROUND

Producing renewable and sustainable energy without releasing greenhouse gases into the environment is a focal point of technology today due to the negative impact that greenhouse gases have on the environment and global warming. Historically, the surface temperature of the Earth has consistently risen, however, these changes have rapidly accelerated in the past 30 years drawing attention to the subject. Carbon dioxide is one of the most significant greenhouse gases as it is consistently added to the environment by human activities, including the burning of fossil fuels for energy sources. Accordingly, there exists a need for an efficient process to harvest renewable energy to prevent the need for fossil fuels and in extension, carbon dioxide emissions into the environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for harvesting energy through pressure retarded osmosis that includes identifying a low salinity feed stream and a high salinity feed stream from a first and second upstream water source. The low salinity feed stream and high salinity feed stream are pumped to a low salinity side of a semi-permeable membrane housing and a high salinity side of a semi-permeable membrane housing. The pressurized low salinity feed stream permeates through the semi-permeable membrane, diluting and pressurizing the pressurized high salinity feed stream, producing a mid-salinity exit stream. The pressurized mid-salinity exit stream rotates a turbine to generate electricity and produce a depressurized mid-salinity fluid.

In another aspect, embodiments disclosed herein relate to a system for harvesting energy through pressure retarded osmosis. The system includes a first upstream water source drawn through a low salinity feed line with a pump upstream of the semi-permeable membrane housing. There is a second upstream water source drawn through a high salinity feed line with a second pump also upstream of a semi-permeable membrane housing. The system contains a semi-permeable membrane housing that includes a container, a semi-permeable membrane dividing the container, a low salinity side of the semi-permeable membrane housing in fluid communication with the low salinity feed line at a first end of the semi-permeable membrane housing, and a high salinity side of the semi-permeable membrane housing in fluid communication with the high salinity feed line at the second end of the semi-permeable membrane housing. The system contains a low salinity exit line at the second end of the semi-permeable membrane housing opposite of the first end. The system contains a pressurized mid-salinity exit line at the first end of the semi-permeable membrane housing upstream of a turbine. There is a generator coupled to the turbine and a depressurized mid-salinity exit line downstream of the turbine.

Other aspects and advantages of the claimed subject matter will be apparent from the following description and the appended claims.

BRIEF DESCRIPTION OF DRAWINGS

The FIGURE is a system diagram of a pressure retarded osmosis process in accordance with one or more embodiments.

DETAILED DESCRIPTION

In one aspect, embodiments disclosed herein relate to a method for harvesting energy through pressure retarded osmosis (PRO) using available upstream water sources of opposing salinities. In another aspect, embodiments disclosed herein relate to a system for harvesting energy through pressure retarded osmosis using available upstream water sources of opposing salinities. In another aspect, embodiments disclosed herein relate to a method for harvesting energy through reverse electrodialysis (RED) using available upstream water sources of opposing salinities.

The FIGURE shows a system diagram of a pressure retarded osmosis process. The system 100 contains a high salinity feed line 105 and a low salinity feed line 140. A first upstream water source 138 is drawn through the low salinity feed line 140. There is a pump 145 in the low salinity feed line 140. The pump 145 pressurizes the low salinity feed line 140, producing a pressurized low salinity feed 150 at a range of 100,000 to 500,000 Pa.

The semi-permeable membrane housing 153 includes a container and a semi-permeable membrane 117 dividing the container 153. The semi-permeable membrane may be constructed of solid-state porous materials, lamellar materials, or two-dimensional materials. Examples of solid-state porous materials include porous alumina, polymer Janus particles, and perfluorinated Nafion™. An example of a lamellar material is carbon nitride. Examples of two-dimensional materials include graphene and graphene oxide. Examples of commercially available semi-permeable membranes suitable for this application include PCA PC-SK, Qianqiu, sPEEK 65, and Fumasep FKD. The salinity of the high salinity fluid impacts the structure of the semi-permeable membrane. Generally, a multilayered semi-permeable membrane is used for high salinity fluids in PRO applications. In RED applications, ion selective membranes for sequential permeation of the salt ions are used.

Referring back to the FIGURE, the container is divided into a low salinity side of the semi-permeable membrane housing 155 and a high salinity side of the semi-permeable membrane housing 115, allowing for the semi-permeable membrane to operate in a counterflow arrangement. A counterflow arrangement is when the two feed streams flowing to the semi-permeable membrane housing travel in opposing directions. In some embodiments, the semi-permeable membrane divides the container vertically, meaning the semi-permeable membrane is vertical and divides the container into two side portions. In FIG. 1, the orientation divides the two sides of the container horizontally. This visual orientation is for process illustration purposes, to clearly show both sides of the semi-permeable membrane. However, other configurations for the membrane and the respective high and low salinity sides of the housing may be used as appropriate.

The low salinity side of the semi-permeable membrane housing 155 is in fluid communication with the pressurized low salinity feed line 150. The pressurized low salinity feed line 150 provides a low salinity fluid to the low salinity side of the semi-permeable membrane housing that permeates an amount of the low salinity fluid through the semi-permeable membrane 117. The remaining low salinity fluid that does not permeate exits to the low salinity side of the semi-permeable membrane housing 155 through a low salinity exit line 160. In some embodiments, the low salinity fluid in the low salinity exit line 160 may be recycled to feed the process. In other embodiments, the low salinity fluid may be returned to the first upstream water source 138.

A second upstream water source 103 is drawn through the high salinity feed line 105. There is a pump 110 in the high salinity feed line 105. The pump pressurizes the high salinity feed line 105, producing a pressurized high salinity feed line 112 remaining below osmotic pressure, at a range of 1,000,000 to 50,000,000 Pa. The high salinity side of the semi-permeable membrane housing 115 is in fluid communication with the pressurized high salinity feed line 112. The low salinity fluid that permeates through the semi-permeable membrane 117 passes through the membrane to the high salinity side of the semi-permeable membrane housing 115. This permeated low salinity fluid combines with the pressurized high salinity fluid provided by the pressurized high salinity feed line 112 to dilute and further pressurize the pressurized high salinity fluid, producing a pressurized mid-salinity fluid at a range of 5,000,000 to 100,000,000 Pa. This pressurized mid-salinity fluid flows through the mid-salinity exit line 120 out of the semi-permeable membrane housing towards a turbine 125 in fluid communication with the mid-salinity exit line 120. The pressurized mid-salinity fluid forces rotation in the turbine 125 and generates electricity, which is stored in a generator 130 coupled to the turbine 125. Once the pressurized mid-salinity fluid rotates through the turbine 125, the fluid continues to flow downstream of the turbine through a depressurized mid-salinity exit line 135 as a depressurized mid-salinity fluid, with a pressure range of 100,000 to 200,000 Pa. In some embodiments, the fluid in the depressurized mid-salinity exit line 135 may be sent to a natural body of water, such as a pond. The depressurized mid-salinity fluid has a salinity ranging from 25,000 to 75,000 g/kg.

The first upstream water source contains a low salinity fluid. In some embodiments, the first upstream water source may be a natural body of water, including pond water. In other embodiments, the first upstream water source may be from an industrial process, including boiler blowdown. A mixture of different water sources may be used provided the salinity of the mixture is suitable for use as the low salinity fluid. As used herein, a low salinity fluid has a salinity ranging from 100 to 1,000 g/kg. In some embodiments, the low salinity fluid may be transported through a process line from the upstream water source. In other embodiments, the low salinity fluid may be transported through a tanker. In other embodiments, the low salinity fluid may be held in a stationary tank that is filled either with a process line or a tanker.

The second upstream water source contains a high salinity fluid. In some embodiments, the second upstream water source may be a natural body of water, such as seawater or naturally occurring brines. In other embodiments, the second upstream water source may be from an industrial process, including produced water and brines from oil and gas operations. As used herein, a high salinity fluid has a salinity ranging from 50,000 to 150,000 g/kg. In some embodiments, the high salinity fluid may be transported through a process line from the upstream water source. In other embodiments, the high salinity fluid may be transported through a tanker.

In other embodiments, the high salinity fluid may be held in a stationary tank that is filled either with a process line or a tanker.

As noted above, one or more embodiments disclosed herein relate to a method for harvesting energy through reverse electrodialysis (RED) using available upstream water sources of opposing salinities. The RED process harvests counterion fluxes across ion exchange membranes to generate a Nernst potential between two saline solutions of different concentrations. As is understood by those skilled in the art, RED systems include a series of ion exchange membranes sandwiched between an anode and a cathode. Upstream water having the salinities noted above may be utilized in a RED system with a high salinity fluid and a low salinity fluid alternating between the anion and cation exchange membranes. The concentration difference and movement of ions through the membranes creates the aforementioned Nernst potential, which can be utilized and harvested as electrical energy.

A method according to one or more embodiments of the present disclosure is show in FIG. 2. The method 200 initiates with step 210 where a low salinity feed is identified from a first upstream water source. In one or more embodiments, the first upstream water source has a salinity ranging from 100 to 1000 g/kg. In step 220, a high salinity feed is identified from a second upstream water source. In one or more embodiments, the second upstream water source has a salinity ranging from 50,000 to 150,000 g/kg. In step 230, the low salinity feed is pumped to a low salinity side of a semi-permeable membrane housing, producing a pressurized low salinity feed stream. In step 240, the high salinity feed is pumped to a high salinity side of the semi-permeable membrane housing, producing a pressurized high salinity feed stream. In one or more embodiments, steps 230 and 240 may happen sequentially or simultaneously. In step 250, an amount of the pressurized low salinity feed stream permeates through a semi-permeable membrane in the semi-permeable membrane housing. This permeation dilutes and further pressurizes the pressurized high salinity feed stream with the low salinity feed stream to produce a mid-salinity exit stream containing pressurized mid-salinity fluid. In step 260, the pressurized mid-salinity fluid rotates a turbine to generate electricity, producing a depressurized mid-salinity fluid.

Embodiments of the present disclosure may provide at least the following advantage. This method and system allow energy harvesting from existing salinity gradients in available upstream water resources, producing renewable energy in the absence of greenhouse gas emissions or other waste streams.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for harvesting energy through pressure retarded osmosis, comprising:

identifying a low salinity feed stream from a first upstream water source;

identifying a high salinity feed stream from a second upstream water source;

pumping the low salinity feed stream, thereby producing a pressurized low salinity feed stream, to a low salinity side of a semi-permeable membrane housing;

pumping the high salinity feed stream, thereby producing a pressurized high salinity feed stream with a pressure in a range of 1,000,000 to 50,000,000 Pa, to a high salinity side of the semi-permeable membrane housing;

permeating an amount of the pressurized low salinity feed stream through the semi-permeable membrane in the semi-permeable membrane housing thereby diluting and further pressurizing the pressurized high salinity feed stream thus producing a mid-salinity exit stream containing pressurized mid-salinity fluid; and rotating a turbine with the pressurized mid-salinity fluid to generate electricity and produce a depressurized mid-salinity fluid.

2. The method of claim 1, wherein the low salinity feed stream and the high salinity feed stream flow in a counter-flow arrangement relative to the semi-permeable membrane.

3. The method of claim 1, wherein the first upstream water source is selected from the group consisting of boiler blowdown, pond water, seawater, and combinations thereof.

4. The method of claim 1, wherein the second upstream water source is selected from the group consisting of seawater, produced water, brine water, and combinations thereof.

5. The method of claim 1, wherein the first upstream water source has a salinity ranging from 100 to 1000 g/kg.

6. The method of claim 1, wherein the second upstream water source has a salinity ranging from 50,000 to 150,000 g/kg.

7. The method of claim 1, wherein the pressurized low salinity feed is in a range of 100,000 to 500,000 Pa.

8. The method of claim 1, wherein the pressurized mid-salinity fluid is in a range of 5,000,000 to 100,000,000 Pa.

9. The method of claim 1, wherein the depressurized mid-salinity fluid is in a range of 100,000 to 200,000 Pa.

10. A system for harvesting energy through pressure retarded osmosis, comprising:

a first upstream water source drawn through a low salinity feed line with a first pump upstream of a semi-permeable membrane housing configured to produce a pressurized low salinity feed stream;

a second upstream water source drawn through a high salinity feed line with a second pump upstream of the semi-permeable membrane housing configured to produce a pressurized high salinity feed stream with a pressure in a range of 1,000,000 to 50,000,000 Pa;

the semi-permeable membrane housing, wherein the semi-permeable membrane housing comprises:

a container;

the semi-permeable membrane dividing the container;

a low salinity side of the semi-permeable membrane housing in fluid communication with the pressurized low salinity feed streamline at a first end of the semi-permeable membrane housing; and a high salinity side of the semi-permeable membrane housing in fluid communication with the pressurized high salinity feed streamline at the second end of the semi-permeable membrane housing;

a low salinity exit line at a second end of the semi-permeable membrane housing opposite of the first end;

a pressurized mid-salinity exit line at the first end of the semi-permeable membrane housing upstream of a turbine;

the turbine in fluid communication with the pressurized mid-salinity exit line;

a generator coupled to the turbine; and a depressurized mid-salinity exit line downstream of the turbine.

11. The system of claim 10, wherein the semi-permeable membrane divides the container vertically.

12. The system of claim 10, wherein the first upstream water source is selected from the group consisting of boiler blowdown, pond water, seawater, and combinations thereof.

13. The system of claim 10, wherein the second upstream water source is selected from the group consisting of seawater, produced water, brine water, and combinations thereof.

* * * * *